United States Patent [19]

Tenney et al.

[11] Patent Number: 4,865,869
[45] Date of Patent: Sep. 12, 1989

[54] FLAKABLE FOOD ADDITIVE PRODUCT CONTAINING STEAROYL LACTYLATE ACID

[75] Inventors: Ralph J. Tenney, Lake Lotawana, Mo.; Hallek B. Warren, Overland Park, Kans.

[73] Assignee: C. J. Patterson Company, Kansas City, Mo.

[21] Appl. No.: 179,752

[22] Filed: Apr. 11, 1988

[51] Int. Cl.$^4$ .............................................. A21D 2/16
[52] U.S. Cl. ..................... 426/653; 426/654
[58] Field of Search ................ 426/554, 99, 653, 24, 426/96, 622, 654

[56] References Cited

U.S. PATENT DOCUMENTS

| | | | |
|---|---|---|---|
| 2,744,825 | 5/1956 | Thompson et al. | 426/24 |
| 2,744,826 | 5/1956 | Thompson et al. | 426/622 |
| 2,789,992 | 4/1957 | Thompson et al. | 426/653 |
| 2,973,270 | 2/1961 | Thompson et al. | 426/554 |
| 3,141,030 | 7/1964 | Buddemeyer et al. | 426/554 |
| 3,146,110 | 8/1964 | Buddemeyer et al. | 426/554 |
| 3,228,772 | 1/1966 | Buddemeyer et al. | 426/554 |
| 3,244,534 | 4/1966 | Buddemeyer et al. | 426/653 |
| 4,164,593 | 8/1979 | Marnett et al. | 426/653 |
| 4,264,639 | 4/1981 | Forsythe | 426/653 |
| 4,371,561 | 2/1983 | Forsythe | 426/653 |
| 4,544,569 | 10/1985 | Forsythe | 426/653 |

Primary Examiner—Marianne Cintins
Attorney, Agent, or Firm—Hovey, Williams, Timmons & Collins

[57] ABSTRACT

A flaked dough conditioning agent is provided which effectively resists aggolmeration so that the agent may be easily scaled and admixed with other ingredients for commercial baking purposes. The agent includes respective quantities of stearoyl lactylic acid and calcium and sodium salts of stearoyl lactylate. Formation of the agent into flakes is achieved by comingling stearoyl lactylic acid and salts of stearoyl lactylate, melting and then blending this mixture, thereafter pouring a thin film of the melted mixture onto a cold plate, and scraping off flakes of the mixture as they form. Cold roll flaking techniques can be employed to produce commercial volumes of the flaked conditioning or emulsifying agent. A free flowing, powdered, dough conditioning and strengthening agent is also provided which includes respective quantities of stearoyl lactylic acid, calcium and sodium salts of stearoyl lactylate, and ethoxylated mono- and diglycerides, which are melted, combined, and cooled into flakes which are then powdered and mixed with soy flour to prevent agglomeration thereof.

7 Claims, No Drawings

FLAKABLE FOOD ADDITIVE PRODUCT CONTAINING STEAROYL LACTYLATE ACID

BACKGROUND OF THE INVENTION

1. Field of the Invention

This invention relates to flaked and powdered conditioning agents for bread doughs and the like. More particularly, the invention is concerned with a flakable conditioning agent comprising respective amounts of stearoyl lactylic acid and sodium or calcium salts of stearoyl lactylic acid. The invention is also concerned with a free-flowing, powdered, dough strengthening agent comprising respective amounts of stearoyl lactylic acid, sodium or calcium salts of stearoyl lactylic acid, and ethoxylated mono- and diglycerides, flaked, powdered and then mixed with defatted soy flour.

2. Description of the Prior Art

Wheat flour baked goods are staple foods in many countries of the world because of their relatively high nutritive value, ready availability of wheat flour at an economical price, and the attractive organoleptic properties of the resultant food products. However, in order to increase the acceptability of wheat flour based products such as breads, it has been recognized that specific additives can advantageously be incorporated into the bread dough prior to baking thereof. In general, these additives possess emulsification, conditioning, and dough strengthening properties which serve to enhance mixing characteristics, increase loaf volume and improve the texture of the finished bread, and moreover tend to produce a final product of improved taste and appearance characteristics.

Stearoyl lactylic acid (SLA), also know as fatty acid lactylates, lactylic stearate and lactylic esters of fatty acids, is a group of compounds which are reaction mixtures which are fully described in the following U.S. Pat. Nos.: 2,973,270; 3,141,030; 3,146,110; 3,228,772; 3,244,534; 2,744,825; 2,744,826; and 2,789,992. SLA has been employed in bread doughs and other bakery products, such as cakes, for a number of years as an emulsifying and conditioning agent. Specifications for SLA are set forth in Food Additive Regulation 21 CFR §172.848.

The specifications for ethoxylated mono- and diglycerides (EOM) are found in Food Additive Regulation 21 CFR §172.834. EOM has found utility, particularly in high fiber breads, as a dough strengthener. The utility of EOM has been set forth in detail in the following U.S. Pat. Nos.: 3,433,645; 3,490,918; 3,752,675; 3,870,799; and 4,590,076.

In the use of such prior art baked products additives, a number of problems have arisen which have heretofore not been solved. In particular, stearoyl lactylic acid has physical and chemical characteristics which prevent it from being flaked, ground, or spray congealed, thereby mandating that the product be commercially available only as a hard solid in the form of large blocks. These resulting large, hard pieces are difficult to handle by the baker, requiring the expenditure of large amounts of time and effort to appropriately size the SLA for accurate scaling into dough or batter formulations. As will be appreciated, homogeneous incorporation of large SLA chunks into dry ingredients is impractical, while melting of these chunks into molten fat for ultimate mixing with the other dough or batter ingredients is time consuming and expensive.

Therefore, there is a need for a stearoyl lactylic acid emulsifying and conditioning agent for baked goods which is easy to handle, package, and accurately scale, for dissolution or melting into heated liquid ingredients and/or dispersing into dry ingredients.

Prior uses of EOM and lactylate in the strengthening and conditioning of loaves has required separate scaling of the EOM and the lactylate due to the lack of an easily scaled combined product. Rapid scaling of undiluted EOM has been commercially impractical due to its oily, semi-gel physical properties. Diluted forms of EOM have been available as a free flowing powder; however, even with such powders, joint use of EOM and SLA has involved the difficult, time and effort consuming task of accurately scaling the solid SLA.

Therefore, there is also a need for a combined stearoyl lactylic acid/EOM dough strengthening and conditioning product for baked goods which permits the baker to make only one scaling per batch and which is in a form that is easy to handle, package, accurately scale, and disperse into dry ingredients.

SUMMARY OF THE INVENTION

The problems outlined above are in large measure solved by the present invention which provides a flaked, stearoyl lactylic acid-containing product or agent for addition to and easy mixing with other ingredients in the formation of doughs or batters for baked goods. The flaked product may be easily scaled and admixed with other ingredients for commercial baking purposes. Broadly speaking, the stearoyl lactylic acid product of the present invention comprises respective amounts of stearoyl lactylic acid and a salt of an alkyl lactylate such as sodium stearoyl lactylate (SSL). These ingredients are selected, melted, blended and flaked so that the product can be easily packaged, handled, accurately scaled, and melted into molten fat or dispersed into dry ingredients. Advantageously, the stearoyl lactylic acid product contains at least 15% of the lactylate salt and can be easily flaked. The product of the present invention can be used to good effect in conditioning and emulsifying of baked goods.

In particularly preferred forms, the product of the invention includes stearoyl lactylic acid and sodium stearoyl lactylate. However, other salts of stearoyl lactylic acid such as calcium stearoyl lactylate and other alkaline earth metal salts of stearoyl lactylic acid find utility in the invention. Even more broadly, the usable alkyl lactylic acid salts would include those salts wherein the alkyl group contains from about 14 to 22 carbon atoms, inclusive. Also, various fillers may be employed in the SLA-alkyl lactylate product.

The most preferred product is produced by heating respective amounts of stearoyl lactylic acid and sodium stearoyl lactylate, stirring these ingredients to ensure uniformity, pouring the melted mixture over a cold plate, and scraping off this mixture during cooling to yield flakes. Commercial quantities of the flaked product may be obtained by using cold roll flaking techniques, which are well known in the art of flake formation.

The present invention also provides a powdered conditioning and dough strengthening product/agent comprising stearoyl lactylic acid, sodium stearoyl lactylate and a member selected from the group consisting of ethoxylated mono- and diglycerides and Polysorbate 60. Broadly speaking, the powdered product of the invention comprises respective amounts of stearoyl lactylic acid, an alkyl lactylate as defined above such as sodium stearoyl lactylate, and either ethoxylated mono- and diglycerides or Polysorbate 60 or mixtures thereof. A bread grain flour may also be used as an anti-agglomeration filler. The stearoyl lactylic acid, alkyl lactylate salt, and ethoxylated mono- and diglycerides (or Polysorbate 60) are melted, blended, flaked, powdered and then mixed with grain flour to prevent agglomeration. The powdered products of the invention can be used to good effect by homogeneous mixing with dry ingredients for baked goods.

In particularly preferred forms, the powdered product of the invention includes stearoyl lactylic acid, sodium stearoyl lactylate, ethoxylated mono- and diglycerides, and soy flour. However, other salts of stearoyl lactylic acid such as calcium stearoyl lactylate, as well as other agglomeration preventing additives in lieu of defatted soy flour, find utility in the invention.

DESCRIPTION OF THE PREFERRED EMBODIMENTS

The preferred flaked stearoyl lactylic acid product in accordance with the present invention includes about 80% by weight of stearoyl lactylic acid and about 20% by weight sodium stearoyl lactylate. The product is in the form of "cornflake" sized flakes having a bulk density of from about 0.28 grams per cubic centimeter to 0.56 grams per cubic centimeter (17.4 lbs/ft$^3$ to 35.0 lbs/ft$^3$).

In its broader aspects, the invention comprehends flaked stearoyl lactylic acid products having from about 5 to 85% by weight of stearoyl lactylic acid, and more preferably from about 50 to 80% by weight thereof; and from about 15 to 95% by weight of salts of $C_{12}$–$C_{22}$ alkyl lactylates such as stearoyl lactylate, and more preferably from about 20 to 50% thereof. The most preferred salts of stearoyl lactylate are selected from the group consisting of sodium stearoyl lactylate, calcium stearoyl lactylate and mixtures thereof. Of course, in selecting the ingredients and particular amounts thereof to be used, the flakability of the resultant composition is the key criteria.

The preferred powdered, dough strengthening product in accordance with the present invention includes about 60% by weight of a combined premix having 15% by weight of stearoyl lactylic acid, 25% by weight ethoxylated mono and diglycerides and 60% by weight of sodium stearoyl lactylate; and further includes about 40% by weight of defatted soy flour blended with the premix to form a final product.

In its broader aspects, the dough strengthening product comprehends an initially flaked and then powdered mixture having from about 40 to 80% by weight, and more preferably from about 50 to 70% by weight, of a combined premix, the latter having from about 5 to 85% by weight, and more preferably from about 10 to 50% by weight, of stearoyl lactylic acid, from about 15 to 95% by weight, and more preferably from about 20 to 50% by weight, of a $C_{12}$–$C_{22}$ alkyl lactylate (most preferably sodium stearoyl lactylate), and up to about 40% by weight, more preferably up to about 30% by weight, of a dough strengthener selected from a group consisting of ethoxylated mono- and diglycerides and Polysorbate 60. This premix is in turn blended with from about 20 to 60% by weight, and more advantageously from about 30 to 50% by weight, of an anti-agglomeration filler such as defatted soy flour. The resultant final product has from about 2 to 68% by weight, more preferably 5 to 35% by weight, of the stearoyl lactylic acid, from about 6 to 76% by weight, and more preferably 10 to 35%, of the alkyl lactylate, up to about 32% by weight, more preferably up to about 15% by weight, of the ethoxylated dough strengthener, and from about 20 to 60% by weight, and more preferably 30 to 50% by weight, of the anti-agglomeration filler.

Stearoyl lactylic acid (SLA) is a mixed product also known as fatty acid lactylates, lactylic stearate and lactylic esters of fatty acids. Stearoyl lactylic acid refers to a group of compounds which are reaction mixtures having the following general structure:

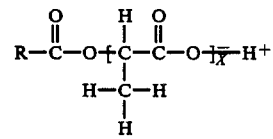

Where the R is a hydrocarbon containing single and/or double bonds (alkanes or alkenes) having a chain length of from about 14 to 22 carbon atoms so as to form fatty acids (e.g., palmitic, stearic, oleic); and where X is from 1 to 4. These reaction mixtures have been described fully in the following U.S. Pat. Nos.: 2,973,270; 3,141,030; 3,146,110; 3,228,772; 3,244,534; 2,744,825; 2,744,826; and 2,789,992. These patents are incorporated by reference herein.

Sodium stearoyl lactylate is generally prepared by admixing lactic acid in an aqueous medium with commercial grade stearic acid (an admixture of myristic, palmitic, and stearic fatty acids) at a sufficiently elevated temperature to remain in the molten condition. In general, 1.0 equivalent of fatty acids is used for each 1 to 2 equivalents of lactic acid as monomer for each lactyl group desired. In this case therefore, about 2 equivalents of lactic acid are provided for each equivalent of fatty acids. The mixture is stirred with heating, whereupon about one equivalent of sodium hydroxide is added. The mixture is then heated to bring the temperature thereof up to about 200° C. to complete the reaction. The reaction is carried out under a flow of an inert gas to remove water vapor and prevent oxidation of the reactants. A solid, slightly cream-colored material is produced upon cooling of the reaction products and it is then ground to a fine powder for use. The powder is a mixture of sodium salts of a homologous series of stearoyl lactylic acids, in which the number of lactyl groups in the molecule is a function of the relative ratios of the constituents brought into the admixture. Calcium stearoyl lactylate is prepared in a similar manner except that calcium carbonate is used as a neutralization agent. A specific procedure for producing sodium stearoyl lactylate is set forth in detail in U.S. Pat. No. 2,789,992 and a specific procedure for producing stearoyl lactylic acid ester is set forth in U.S. Pat. No. 2,733,252. The specifications for sodium stearoyl lactylate are set forth in Food Additive Regulation 21 CFR, §172.848. All of these references are incorporated by reference herein.

Ethoxylated mono- and diglycerides (EOM) refers to a group of compounds described in the Food Chemicals Codex, Third Edition (1981), as ethoxylated mono- and diglycerides; polyoxyethylene (20), mono- and diglycerides of fatty acids; and polyglycerate-60. EOM is a mixture of stearate, palmitate, and lesser amounts of myristate partial esters of glycerin condensed with approximately 20 moles of ethylene oxide per mole of alpha-monoglyceride reaction mixture having an average molecular weight of 535 (±10%). It is further described as a pale, slightly yellow colored, oily liquid or semi-gel. EOM is further defined in the usage in foods as covered in the Food Additive Regulations published in the Code of Federal Regulations (CFR) Title 21, 172.834.

Although ethoxylated mono- and diglycerides (EOM) is the preferred (preferred over P-60) dough strengthening agent, Polysorbate 60 (P-60) can be substituted for ethoxylated mono- and diglycerides in the flakable compositions of the present invention. Polysorbate 60 refers to a group of compounds described in the Food Chemicals Codex, Third Edition (1981), as Polysorbate 60, or Polyoxyethelene (20) sorbitan monostearate. The product is a mixture of stearate and palmitate partial esters of sorbital and sorbital anhydrides condensed with approximately 20 moles of ethylene oxide for each mole of sorbitol and its mono- and dianhydrides. It is further described as a lemon to orange colored, oily liquid or semi-gel having a faint characteristic odor and a warm, somewhat bitter taste. Polysorbate 60 has been shown to have dough strengthening effects in bread, resulting in improved loaf volume, these effects having been described in the following patents and publications which are incorporated by reference herein: U.S. Pat. No. 3,851,066; U.S. Pat. No. 3,859,445; U.S. Pat. No. 3,870,799; and an article of Tenney, R. J., entitled "Dough Conditioners/Bread Softeners, the Surfactants Used in Baking". Bakers Digest, 52(4)24, 1978.

In preferred production procedures, the flaked SLA products in accordance with the invention are prepared by combining amounts of SLA, SSL and/or CSL, heating this combination to 75° C. until a clear melt is formed, stirring this molten combination at 70° to 75° C. to ensure uniformity, and then pouring the melted combination over a cold stainless steel plate which is cooled by a coil circulating water at 12° C. therein. The combination then forms a thin layer over the cold plate which may be scraped off the plate with a spatula as the combination forms into "cornflake" sized flakes. Preferred commercial production procedures involve combining and heating the combination as previously stated; however, flake formation is performed by a cold roll flaking procedure which is known in the art of flake making. In the case of three component systems, the SLA, alkyl lactylate salt and EOM and/or P-60 are similarly co-melted and flaked. Thereupon, the flaked product may be powdered and mixed with a filler as described.

EXAMPLES

The following examples set forth SLA compositions tested for their flakability according to the cold plate flake production procedure set forth above.

| Compositions | Flaking Characteristics |
| --- | --- |
| 75% SLA + 25% SSL | Good |
| 80% SLA + 20% SSL | Good |
| 85% SLA + 15% SSL | Marginal |
| 90% SLA + 10% SSL | Would not flake |
| 75% SLA + 25% CSL | Good |
| 80% SLA + 20% CSL | Good |
| 85% SLA + 15% CSL | Good |
| 90% SLA + 10% CSL | Marginal |
| 95% SLA + 5% CSL | Would not flake |
| 100% SLA | Would not flake |
| 50% SLA + 50% SSL | Good |
| 33.3% SLA + 66.7% SSL | Good |

| Compositions | Flaking Characteristics |
| --- | --- |
| 50% SLA + 50% CSL | Good |
| 33.3% SLA + 66.7% CSL | Good |
| 70% SSL + 30% P-60 | Good |
| 50% SSL + 50% P-60 | Would not flake |
| 60% SSL + 40% P-60 | Would not flake |
| 90% SSL + 10% P-60 | Good |

FLAKING STUDIES OF SLA, SSL, AND EOM CO-MELTS

| SLA | SSL | EOM | |
| --- | --- | --- | --- |
| 0 | 100 | 0 | Would flake |
| 80 | 20 | 0 | Would flake |
| 65 | 30 | 5 | Would flake |
| 50 | 40 | 10 | Would flake |
| 35 | 50 | 15 | Would flake |
| 20 | 60 | 20 | Would flake |
| 0 | 70 | 30 | Would flake |
| 80 | 10 | 10 | Would not flake |
| 20 | 50 | 30 | Would not flake |
| 10 | 90 | 0 | Would flake |
| 20 | 80 | 0 | Would flake |
| 100 | 0 | 0 | Would not flake |
| 0 | 0 | 100 | Would not flake |

FLAKING STUDIES OF SLA, SSL, AND P-60 CO-MELTS

| SSL | SLA | P-60 | |
| --- | --- | --- | --- |
| 70 | 15 | 15 | Good |
| 40 | 55 | 5 | Good |
| 40 | 25 | 35 | Would not flake |
| 25 | 65 | 10 | Would not flake |

A formula for multigrain high fiber bread was used to conduct tests to illustrate the value of the dough strengthener composition containing EOM. The formula and general procedures are shown in Table I. Abused loaf volumes of high fiber breads containing normal gluten levels (11% gluten flour weight) and low gluten levels (9% gluten flour weight) were determined using either amounts of the flaked dough strengthener product of the present invention, a combination of separately scaled SSL and EOM, or no strengthener added to the dough at all. The flaked experimental strengthener employed included 65% by weight SSL, 10% by weight SLA, and 25% by weight EOM. The separately scaled SSL includes 100% by weight of sodium stearoyl lactylate, and the separately scaled EOM product includes 50% by weight EOM and 50% by weight triglyceride. The gluten employed in the bread was vital wheat gluten. The loaves tested either contained 0.68% by weight of the flaked experimental strengthener, 0.34% by weight of the scaled SSL and 0.68% by weight of the EOM product, or no strengthener at all. Additional shortening was employed in some of the loaves to determine the effect of shortening at a level equivalent to the shortening contained in the EOM product on abused loaf volume. Table II sets forth the abused loaf volumes of the various loaves and illustrates that the addition of dough strengthener to the dough greatly increases the abused loaf volumes of the breads. The test results further illustrate that the abused loaf volume of the high fiber, low gluten breads can be equal to or greater than the abused loaf volumes of the high gluten bread, thereby establishing that by addition of the dough strengthener, costly gluten can be eliminated from the bread formula without adversely affecting loaf volume. As also shown in the table of results, the loaves containing the flaked experimental strengthener had somewhat greater loaf volumes than did the breads containing the separately scaled SSL and EOM, even though these loaves contained equal amounts of the dough strengthener (EOM). A dough abuse test was used to simulate rough handling to fully proofed doughs on conveyor lines, rough starting and stopping from the proof box to oven, and rough handling during oven loading. The dough abuse test employed sixteen ounces of dough per loaf placed in standard one pound loaf pans. Abuse of the dough consisted of placing both ends of the pan containing the fully proofed dough on blocks of wood 3.75 inches high. The blocks were pulled from under the pans and the pans were allowed to strike the countertop. This procedure was repeated three times. The abused doughs were then baked, depanned, placed on a wire rack, cooled for 45 minutes, and their loaf volumes were then measured by the rapeseed displacement method. The loaves were then placed in plastic bags for storage and after 24 hours were sliced and assigned a relative quality score as indicated in Table I below. Loaf volume is an accepted means of determining the dough strengthening effect of ingredients and the bread making quality of flours.

TABLE I

MULTI-GRAIN, HIGH FIBER BREAD

FORMULA:

| SPONGE: | LBS. | % |
|---|---|---|
| Flour | 176 | 44 |
| Water | 280 | 70 |
| Yeast | 8 | 2 |
| Yeast food | 1½ | 0.375 |
| Gluten | 44 | 11 |
| *Multi-Grain Mix | 120 | 30 |
| Vegetable Oil | 2 | 0.5 |
| Dough Strengthener | variable | |

DOUGH:

| | | |
|---|---|---|
| Flour | 60 | 15 |
| Water | 68 | 17 |
| High Fructose | 44 | 11 |
| Soy Flour | 4 | 1 |
| Whey | 4 | 1 |
| Dry Molasses | 16 | 4 |
| Salt | 8 | 2 |
| Yeast Food | 1 | 0.25 |
| Ascorbic acid | (80 ppm of flour) | (80 ppm of flour) |
| Yeast | 7 | 1.75 |

PROCESSES:

SPONGE

| | |
|---|---|
| Mixing time (Hobart A-200 w. McDuffy Bowl) | 3 low (44 rpm) |
| Temperature from mixer | 80° F. |

TABLE I-continued

MULTI-GRAIN, HIGH FIBER BREAD

| | |
|---|---|
| Fermentation cabinet temperature | 84° F. |
| Fermentation time | 4.5 hours |

DOUGH:

| | |
|---|---|
| Mixing time (Hobart A-200 w. McDuffy Bowl) | 2 low + 5 med (88 rpm) |
| Temperature from mixer | 80° F. |
| Floor time | 45 minutes |
| Proofing | 105° F., 87% r.h. |
| Baking | 435° F. for 20 minutes |

*The ingredient legend of the mix stated: powdered cellulose, wheat bran, whole wheat, unbleached wheat flour, whole rye, defatted flaxseed meal, and calcium sulfate.

BAKING COMPARISON OF EXPERIMENTAL DOUGH STRENGTHENER TO SSL AND EOM PRODUCT WITH AND WITHOUT SHORTENING ADJUSTMENT (11% AND 9% GLUTEN LEVELS) (AVERAGE OF TRIPLICATE DOUGHS)

| | LEVEL % FLOUR WT. | GLUTEN % FLOUR WT. | ADDITIONAL SHORTENING | ABUSED LOAF VOLUME, C.C. | QUALITY SCORE |
|---|---|---|---|---|---|
| Experimental Strengthener | 0.68 | 11% | 0.34 | 2367 | 84.5 |
| Experimental Strengthener | 0.68 | 11% | 0 | 2342 | 84.5 |
| SSL + EOM Combination | 0.34 + 0.68 | 11% | 0 | 2313 | 84.3 |
| No Strengthener Control | — | 11% | 0 | 1700 | 81.8 |
| Experimental Strengthener | 0.68 | 9% | 0.34 | 2371 | 84.3 |
| Experimental Strengthener | 0.68 | 9% | 0 | 2396 | 84.3 |
| SSL + EOM Combination | 0.34 + 0.68 | 9% | 0 | 2317 | 84.7 |
| No Strengthener Control | — | 9% | 0 | 1758 | 82.3 |

MATERIALS:
1. Experimental strengthener; 65% SSL, 10% SLA, 25% EOM.
2. SSL: 100% sodium stearoyl lactylate, commercial.
3. EOM Product; 50% EOM, 50% triglyceride, commercial.
4. Gluten; Vital wheat gluten, frequently used to supplement the protein content of bakers grade patent flour, commercial

We claim:

1. A dough conditioning and emulsifying agent in the form of discrete flakes having a density of from about 0.28 grams per cubic centimeter to about 0.56 grams per cubic centimeter which comprises from about 5% to about 85% by weight of stearoyl lactylic acid and from about 15% to about 95% by weight of a salt of a $C_{12}$ to $C_{22}$ alkyl lactylate.

2. The agent as set forth in claim 1, wherein said salt of an alkyl lactylate is a salt of a stearoyl lactylate.

3. The agent as set forth in claim 2, wherein said salt of stearoyl lactylate is selected from the group consisting of sodium stearoyl lactylate, calcium stearoyl lactylate, and combinations thereof.

4. The agent as set forth in claim 3, wherein said salt of stearoyl lactylate is sodium stearoyl lactylate.

5. The agent as set forth in claim 1, wherein said lactylate salt is present at a level of from about 20 to 50% by weight.

6. The agent as set forth in claim 1, said lactylic acid being present at a level of from about 50 to 80% by weight.

7. A dough conditioning and strengthening agent in the form of discrete flakes having a bulk density of from about 0.28 grams per cubic centimeter to about 0.56 grams per cubic centimeter and which comprises from about 5% to about 85% by weight of stearoyl lactylic acid, up to about 40% by weight of a member selected from the group consisting of ethoxylated mono and diglcerides and polysorbate 60, and from about 15% to about 95% by weight of a salt of a $C_{12}$ to $C_{22}$ alkyl lactylate.

* * * * *